March 16, 1971  C. F. HOGLUND  3,570,834
WORK FIXTURE AND FIXTURE SHUTTLE FOR MOVING A PLURALITY OF WORK PIECES TO AND FROM WORKING POSITIONS
Filed Aug. 9, 1968  4 Sheets-Sheet 1

INVENTOR
CARL F. HOGLUND
BY William A. Zalesak
ATTORNEY

March 16, 1971   C. F. HOGLUND   3,570,834
WORK FIXTURE AND FIXTURE SHUTTLE FOR MOVING A PLURALITY OF WORK
PIECES TO AND FROM WORKING POSITIONS
Filed Aug. 9, 1968   4 Sheets-Sheet 2

INVENTOR
CARL F. HOGLUND
BY William A. Zalesak
ATTORNEY

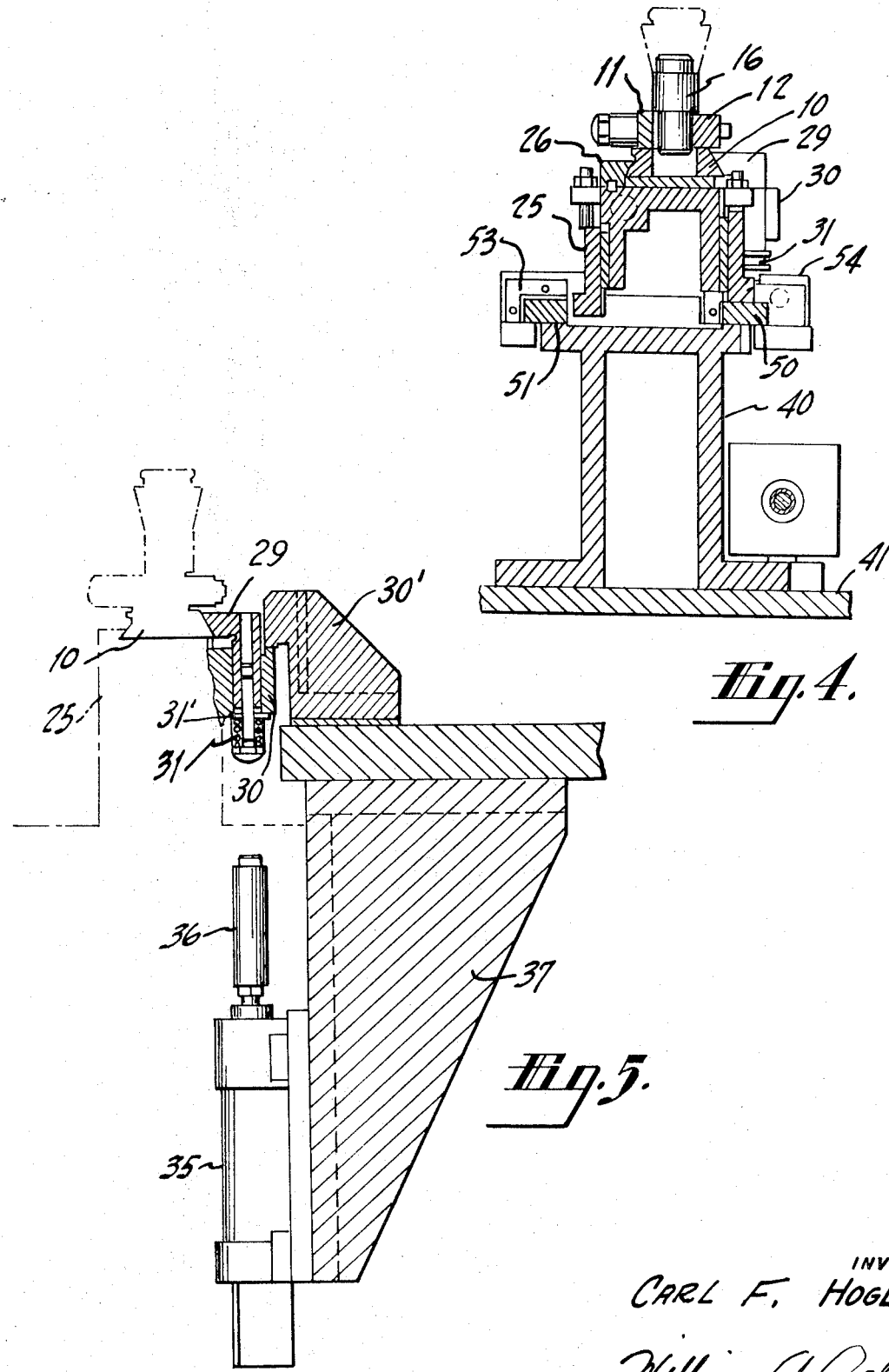

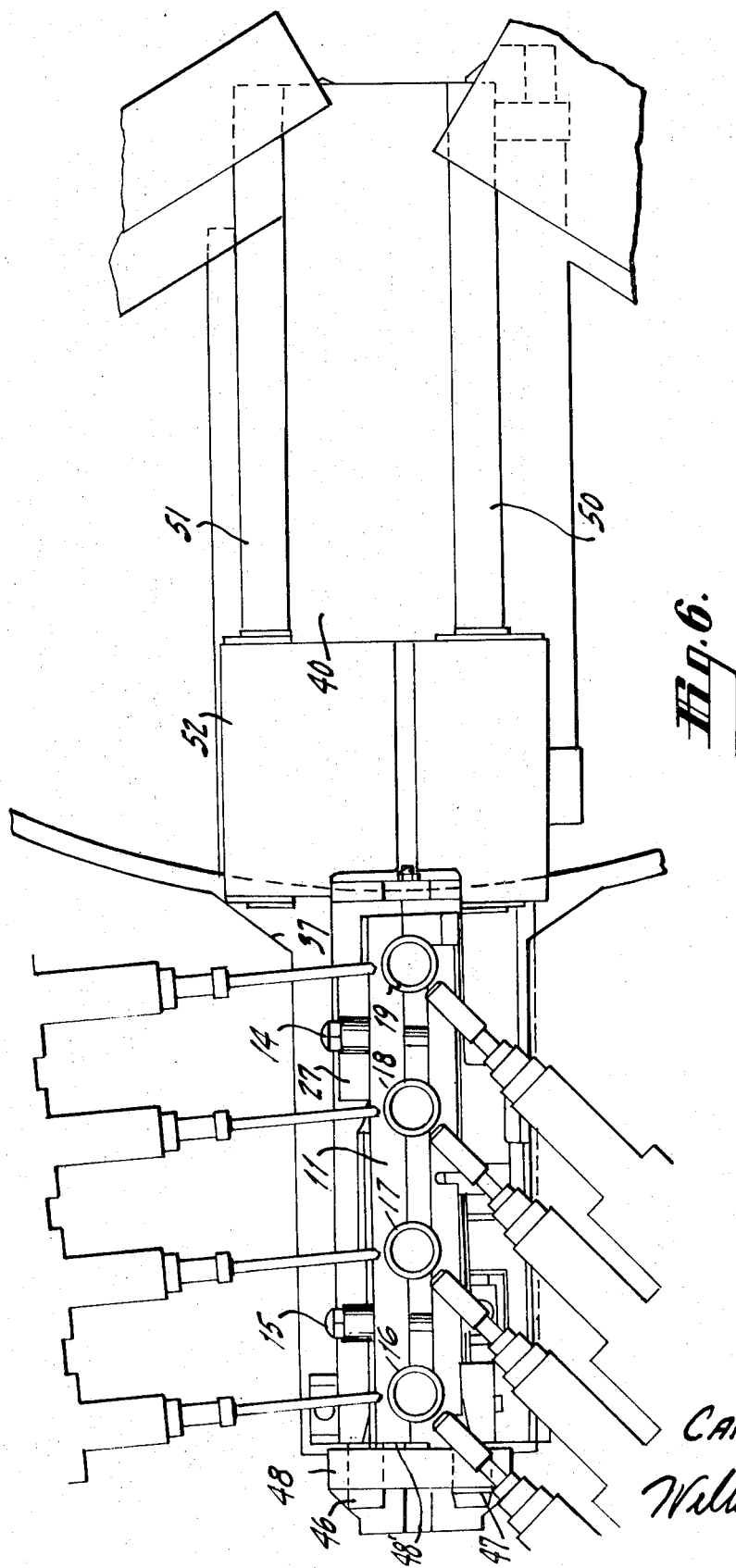

United States Patent Office 3,570,834
Patented Mar. 16, 1971

3,570,834
WORK FIXTURE AND FIXTURE SHUTTLE FOR MOVING A PLURALITY OF WORKPIECES TO AND FROM WORKING POSITIONS
Carl F. Hoglund, Murray Hill, N.J., assignor to Hoglund Engineering and Manufacturing Company, Inc., Berkeley Heights, N.J.
Filed Aug. 9, 1968, Ser. No. 751,599
Int. Cl. B23q 1/16; B23p 23/06
U.S. Cl. 269—25                                              4 Claims

ABSTRACT OF THE DISCLOSURE

Apparatus including a shuttle slidably supported on a slide guide and movable between a retracted non working position and an extended working position, the shuttle having novel means for receiving and holding a fixture supporting a plurality of workpieces, other means on the shuttle for locking the fixture in the shuttle, other means for accurately positioning the fixture in working position and other means for releasing the locking means on the shuttle.

BACKGROUND OF THE INVENTION

Normally apparatus for performing operations at a plurality of different successive operating positions employ fixtures for supporting a single workpiece which is moved from an initial position to successive positions. Such for example are fixtures for holding workpieces for in line operation. These fixtures are normally fixed to the mechanism which moves the workpieces to the successive working positions and require in many cases complicated mechanisms to insure that the fixtures and workpieces carried thereby register accurately with the tools to be used on the workpieces or feeding devices for feeding parts to and associated with the fixtures. The fixtures in the above cases must be loaded with the workpieces while on the machines.

SUMMARY OF THE INVENTION

The apparatus includes a base, which can be movable, supporting a slide guide having appositely disposed rails. A shuttle having jibs engaging the rails is movable between a forward working position and a retracted non working position. The shuttle is operated by a hydraulic piston. The shuttle has under cut ways for receiving a fixture or cartridge having a dove tail engaging the ways and which supports a plurality of workpieces. A locking clamp on the shuttle locks the fixture on the shuttle. A stop on a table, which supports work tools contacts the fixture in its forward position to accurately position the fixture with reference to the tools at the working position. The clamp is released by an automatically operated piston mounted on the table.

BRIEF DESCRIPTION OF THE DRAWINGS

FIG. 4 is a section taken along the line 4—4 of FIG. 3 and

FIG. 5 is a section taken along the line 5—5 of FIG. 3 in the unloading position.

FIG. 6 is a plan view of the loaded shuttle in its extended position at a working station.

DESCRIPTION OF THE PREFERRED EMBODIMENTS

Figure 2:
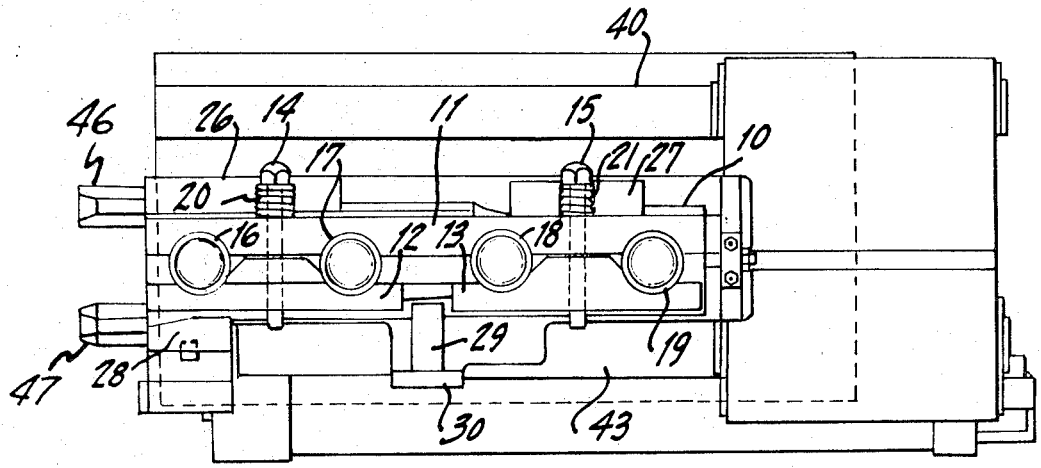
FIG. 2 is a plan view of a shuttle and loaded cartridge made according to my invention.
Figure 3:
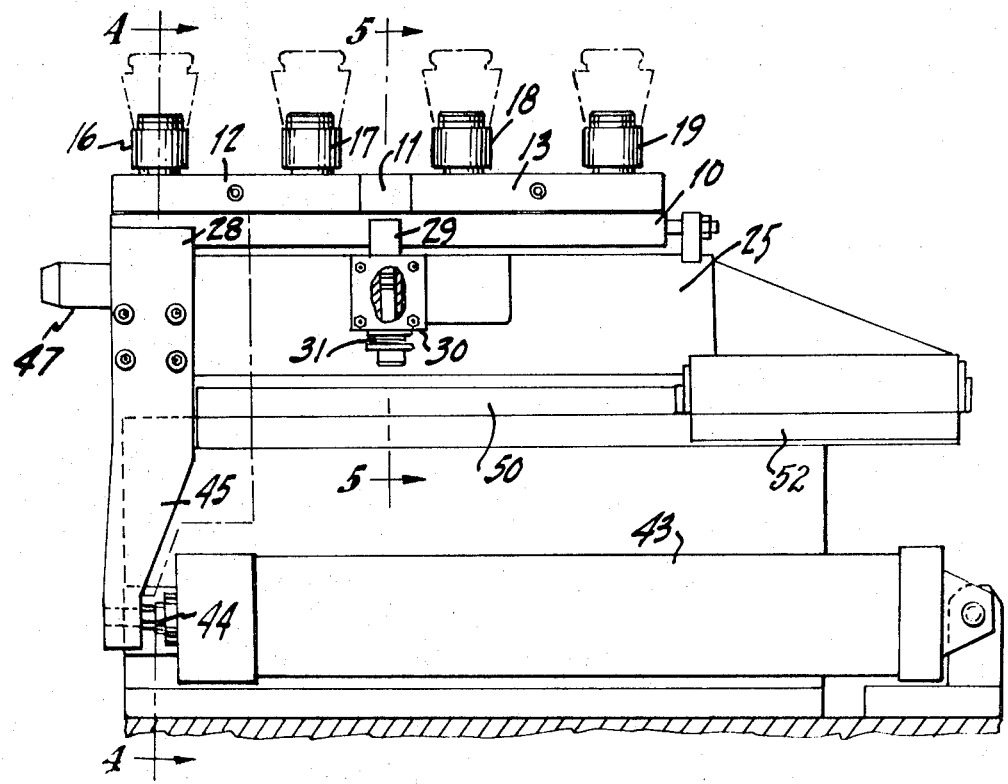
FIG. 3 is a side elevation of FIG. 2.

Referring to the drawings, the work holding fixture or cartridge 10 is provided with a dove tail bottom (FIG. 4). The cartridge has fixed thereto a work clamping element 11. Cooperating with element 11 are a pair of movable clamps 12 and 13. Threaded bolts 14 and 15 pass through clamping elements 11 and 12 and threadedly engage the clamping members 12 and 13 for clamping workpieces directly or adapters such as 16, 17, 18 and 19 (FIGS. 2 and 3). Compression springs 20 and 21 are positioned between the heads of the bolts 14 and 15 clamping element 11 to permit quick release of the adapters and the workpieces. The fixture can be loaded while off the shuttle.

The shuttle is movable between working and retracted positions and is designed to releasably clamp the cartridge in place for operations on the workpieces. The shuttle may be supported on a rotatable turret or movable base for moving the shuttle and workpieces to a series of successive working positions.

The shuttle 25 is provided with under cut members 26, 27 and 28 (FIGS. 1, 2 and 3) which slidably receive the cartridge 10. A locking mechanism for locking the fixture or cartridge 10 in position on the shuttle includes an undercut sliding clamp 29 secured to the shuttle by bracket 30 in which the clamp is slidably mounted. The clamp is held down against the fixture 10 by a compression spring 31 (FIGS. 2, 3, 4, and 5).

As shown in FIG. 5, a hydraulic cylinder 35 carries at the upper end of its piston rod a rest button 36. When the shuttle is in loading or unloading position, the cylinder can be actuated causing the rest button to move upwardly against the end of sliding clamp 29 compressing spring 31 to release the clamp freeing the fixture 10. This cylinder can be fixed to a tool supporting table 37 for example. The upper seat for spring 31 is shown at 31'.

The shuttle 25 may be slidably supported on radially extending slide guides on a rotatable turret or other supports which can be moved to successive working positions. If a turret is used it may be mounted within an opening of an annular tool supporting table. During rotation the shuttle is in a retracted position, but upon registering with a work position the shuttle is moved forward into a working position.

Figure 1:
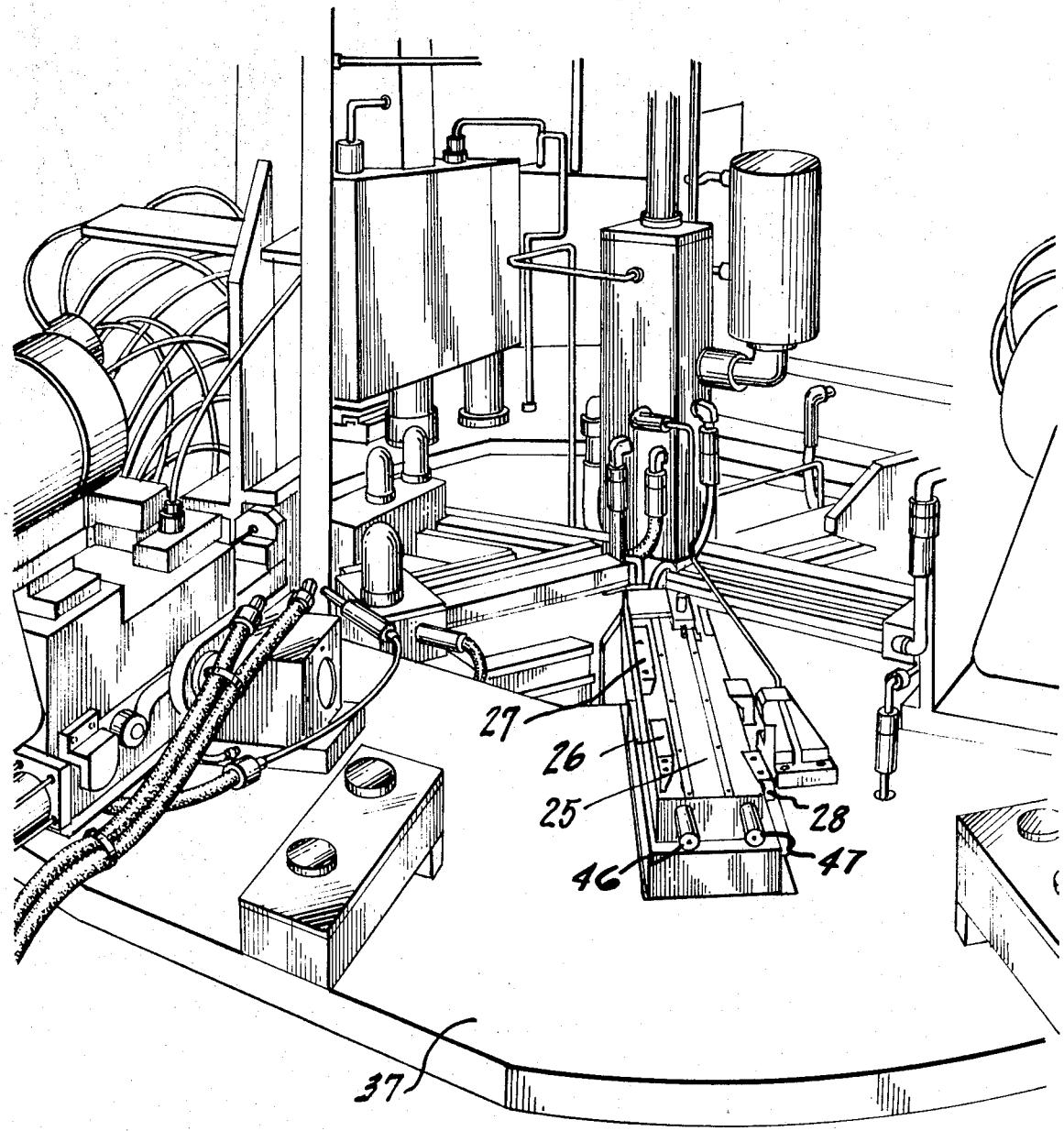
FIG. 1 is a perspective of a shuttle made according to my invention as used in a turret type of apparatus without the loaded cartridge and in loading position.

As shown in FIGS. 1, 3 and 4, the shuttle 25 is slidably mounted on a slide guide 40 mounted on a movable base, for example the rotatable turret 41. The turret is mounted within an opening in the annularly shaped tool supporting table 37. In FIG. 1 the fixture has been removed from the shuttle 25.

Mounted on the slide guide 40 is a hydraulic cylinder 43, having its piston rod 44 secured to a bracket 45 in turn fixed to the shuttle 25. When cylinder 43 is energized it moves the shuttle 25 into its working position at the different working stations.

A pair of guide pins 46 and 47 are secured to the shuttle and are received within apertures in the guide bar 48 mounted on the tool supporting table 37. The guide bar also supports a stop member 48' against which the fixture 10 abuts to accurately position it and the workpieces loaded thereon. Thus if the fixture is inadvertently not positioned accurately in the shuttle no errors in locating the workpieces occur since it is the fixture itself which determines position and not the shuttle. The relative position of the tools with respect to the workpieces are shown in outline.

In more detail, the slide guide 40 is provided with a pair of rails 50 and 51. The shuttle is provided at one end with a shuttle slide support or housing 52, having jibs 53 and 54 which slidably engage the rails 50 and 51. This arrangement permits hydraulic cylinder 43 to move the shuttle and fixture from a retracted position to an extended working position and return.

When the clamp 29 is in loading or unloading position, a backup bracket 30' on tool table 37 registers with clamp bracket 30 to take up pressure exerted by rest button 36 when rest button 36 is in contact with sliding clamp 29.

What is claimed is:
1. A shuttle and fixture assembly including:
   a base,
   a slide guide mounted on said base,
   a shuttle slidably mounted on said slide guide, said shuttle being movable between a retracted and an extended working position,
   said shuttle having undercut portions,
   a fixture for supporting a plurality of workpieces and having a dovetail portion received by the undercut portions of said shuttle,
   a clamp on said shuttle for clamping said fixture thereto and biased to clamping position,
   a tool support,
   a stop on said tool support for engaging said fixture for accurately positioning said fixture when in working position, and
   means on said base for actuating said shuttle.
2. A shuttle and fixture assembly including:
   a base,
   a slide guide mounted on said base,
   a shuttle slidably mounted on said slide guide including a shuttle slide support engaging said slide guide, said shuttle being movable between a retracted and an extended working position,
   said shuttle including an extension on said slide support having undercut portions,
   a fixture for supporting a plurality of workpieces and having a dovetail portion received by the undercut portions of said shuttle,
   a clamp on said shuttle for clamping said fixture thereto and biased to clamping position,
   a tool support,
   means on said base for actuating said shuttle,
   and a hydraulically operated means on said tool support for releasing said clamp.
3. A shuttle and fixture assembly including:
   a base,
   a slide guide mounted on said base including oppositely disposed longitudinally extending rails thereon,
   a shuttle slidably mounted on said slide guide rails including a shuttle slide support engaging said rails, said shuttle being movable between a retracted and an extended working position,
   said shuttle including an extension on said slide support having undercut portions,
   a fixture for supporting a plurality of workpieces and having a dovetail portion received by the undercut portions of said shuttle,
   a clamp on said shuttle for clamping said fixture thereto and biased to clamping position,
   a guide pin on said shuttle,
   a tool support,
   an apertured guide on said tool support for receiving said pin,
   a stop on said tool support for engaging said fixture for accurately positioning said fixture when in working position, and
   means on said base for actuating said shuttle.
4. A shuttle and fixture assembly including:
   a base,
   a slide guide mounted on said base including oppositely disposed longitudinally extending rails thereon,
   a shuttle slidably mounted on said slide guide rails incluing a shuttle slide support engaging said rails, said shuttle being movable between a retracted and an extended working position,
   said shuttle including an extension on said slide support and having undercut portions,
   a fixture for supporting a plurality of workpieces and having a dovetail portion received by the undercut portions of said shuttle,
   a clamp on said shuttle for clamping said fixture thereto and biased to clamping position,
   a guide pin on said shuttle,
   a tool support,
   an apertured guide on said tool support for receiving said pin,
   a stop on said tool support for engaging said fixture for accurately positioning said fixture when in working position,
   means on said base for actuating said shuttle,
   and a hydraulically operated means on said tool support for releasing said clamp.

References Cited
UNITED STATES PATENTS

| | | | |
|---|---|---|---|
| 1,408,997 | 3/1922 | Fretter | 29—38 |
| 2,398,659 | 4/1946 | Mead | 269—20UX |
| 3,139,177 | 6/1964 | Allemann | 269—58X |
| 3,213,996 | 10/1965 | Tech | 198—19 |
| 3,438,478 | 4/1969 | Bridge | 198—19 |

LESTER M. SWINGLE, Primary Examiner

U.S. Cl. X.R.

269—57, 81; 29—38; 198—19